United States Patent [19]

Nohren, Jr.

[11] Patent Number: 4,769,144

[45] Date of Patent: * Sep. 6, 1988

[54] WATER TREATMENT APPARATUS

[75] Inventor: John E. Nohren, Jr., St. Petersburg, Fla.

[73] Assignee: Alan R. Filson, Clearwater, Fla.; trustee

[*] Notice: The portion of the term of this patent subsequent to Sep. 22, 2004 has been disclaimed.

[21] Appl. No.: 29,720

[22] Filed: Mar. 24, 1987

Related U.S. Application Data

[63] Continuation-in-part of Ser. No. 822,238, Jan. 29, 1986, Pat. No. 4,695,379.

[51] Int. Cl.⁴ .............................................. B01D 27/02
[52] U.S. Cl. ..................................... 210/282; 222/482
[58] Field of Search ............... 210/238, 282, 290, 291; 222/478, 481, 547, 564, 566, 568, 570, 575, 482; 239/377, 524

[56] References Cited

U.S. PATENT DOCUMENTS 4,238,040 12/1980 Fitzpatrick ........................... 215/274
4,695,379 9/1987 Nohren et al. ....................... 210/282

Primary Examiner—Ivars Cintins
Attorney, Agent, or Firm—Nixon & Vanderhye

[57] ABSTRACT

A water treatment system and related components for reducing contaminants in normal drinking water are provided. An enlongated tube has first and second ends and is connected with an interference fit at its first end to the interior surface of a neck of a conventional bottle. Water treatment media is disposed within the tube adjacent its second end, such as activated charcoal, silver impregnated media, ion exchange resins, or calcium and/or magnesium leaching material. The tube includes a flange adjacent its first end which minimizes the possibility that water will enter the bottle except by flowing through the open first end of the tube. A cap is provided for disposition over the tube, a lower portion of the cap sealing the open first end of the tube to prevent water from flowing through it, and apertured substantially 360 degrees around its circumference to allow free flow of water from the bottle which has already been treated by the treatment media wuen an upper portion of said cap is moved axially relative to the lower portion from a closed to an open position. An adaptor is also provided for converting a snap-on cap bottle neck to a screw-on cap bottle neck so that a screw-on type cap may be utilized with either type bottle neck.

15 Claims, 4 Drawing Sheets

WATER TREATMENT APPARATUS

RELATED APPLICATIONS

This application is a continuation-in-part of copending application Ser. No. 822,238, filed Jan. 24, 1986, now U.S. Pat. No. 4,695,379.

BACKGROUND AND SUMMARY OF THE INVENTION

There are many areas across the country that have significant amounts and types of contaminants in their drinking water. It is desirable, of course, to remove contaminants if possible; however, there have been a number of difficulties associated with producing a device that will remove a wide variety of target contaminants quickly and simply, and in an inexpensive manner.

According to the present invention, a water treatment apparatus is provided which is simple and inexpensive to manufacture, simple and easy to use, and successfully removes a wide variety of, or any desired specific, contaminants normally present in tap water. The apparatus cooperates with a conventional common household container such as an empty milk bottle or juice jug, or like plastic or glass bottles, and ensures that only treated water is dispensed from the container once it is filled with water which is treated by the apparatus.

The three basic components of the apparatus according to the invention comprise an elongated tube, a cartridge containing water treatment media, and a cap. An additional adaptor component is also provided which enables use of a single cap design with different container or bottle designs.

The tube, which commonly would be of plastic, has open first and second ends. Adjacent its open first end, the tube has a plurality of projections extending radially from it, which projections are spaced from each other circumferentially around the tube, and which are adapted to make an interference fit with the interior surface of the neck of a conventional bottle or the like. A radially outwardly extending flange is also provided on the top of the projections, the flange minimizing the possibility that water will enter the bottle except by flowing through the open first end of the tube. The components are dimensioned so that liquid from within the bottle can flow between the interior surface of the bottle neck and the exterior surface of the tube, around the projections and past the flange, to be dispensed.

The water treatment media can comprise any of a wide variety of water treatment media such as activated carbon (or like material) to remove organic materials; silver impregnated coral sand (or like media) to destroy bacteria; ion exchange resins for removing sodium or other specific ionic materials; and/or materials which leach magnesium and calcium back into the water. Media typically would be disposed within a cartridge, and the cartridge inserted into the tube adjacent the open second end thereof.

The cap cooperates with the exterior surface of the bottle neck, and is adapted to close off the tube first end while allowing passage of liquid from within the bottle between the tube and the neck. In one exemplary embodiment, the cap includes an upper portion axially spaced from and substantially co-extensive with a lower portion, the lower portion having a plurality of arcuately shaped openings therein which are circumferentially spaced from each other around substantially 360 degrees. The upper and lower portions are spaced from each other a distance sufficient to allow liquid to flow through the openings in the lower portion top surface and to the space between the upper portion and the lower portion, and then away from the cap. The cap is affixed to the outer surface of the bottle neck by screw threads, cooperating snap rings, or the like. The cap typically would be made of high density polyethylene.

In another embodiment, the upper portion of the cap, axially spaced from the lower portion of the cap by an integral center peg, is removable by reason of the center peg being snap-fit into a hole formed in the lower portion.

In another embodiment, the upper portion of the cap is captured within the lower portion of the cap but frictionally slidable between open and closed positions.

In still another embodiment, the upper portion of the cap is captured within the lower portion of the cap but freely slidable therein so that it remains normally closed by reason of gravitational forces when the bottle or container is in an upright position, but opens automatically upon a substantial tilting movement.

In a related aspect, this invention provides an adaptor which converts a bottle designed for snap-on tops or caps to a bottle which is capable of receiving screw-on caps.

It is, therefore, the primary object of the present invention to provide a simple yet effective water treatment apparatus which may be simply and inexpensively used for removing contaminants from drinking water. This and other objects of the invention will become clear from an inspection of the detailed description of the drawings, and from the appended claims.

DETAILED DESCRIPTION OF THE DRAWINGS

Figure 1:
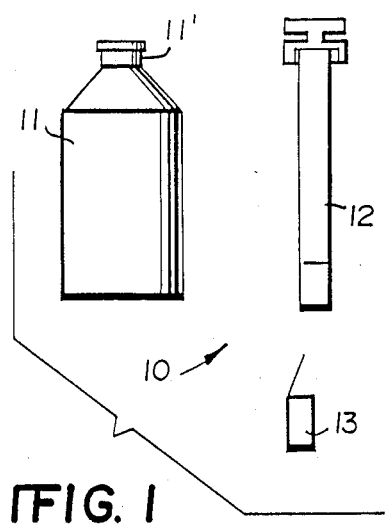
FIG. 1 is a side schematic view illustrating a water treatment device according to the present invention, and a bottle with which it is adapted to be utilized.
Figure 2:
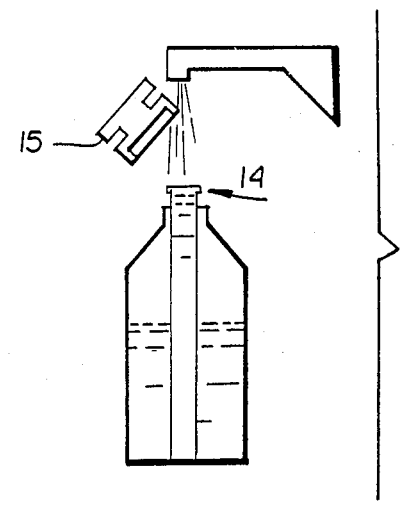
FIG. 2 is a side schematic view showing the device of FIG. 1 in use with a bottle during the filling of the bottle, and with the cap of the device removed.
Figure 8:
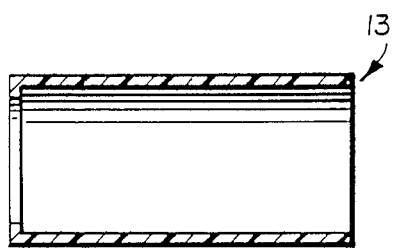
FIG. 8 is a side cross-sectional view of the cartridge of the device of FIG. 1.
Figure 9:
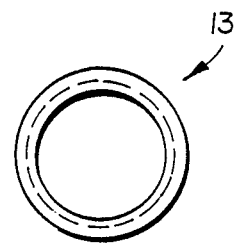
FIG. 9 is a bottom plan view of the cartridge of FIG. 8.

An exemplary water treating device according to the present invention is illustrated generally by reference numeral 10 in the drawings, and it is adapted to be utilized in association with a conventional container such as a bottle 11 which has a neck 11'. The bottle 11 typically would be of glass or plastic. The major components of the device 10 comprise the tube 12, which is seen most clearly in FIGS. 4 through 7, a cartridge 13 for the water treatment media, which is seen most clearly in FIGS. 1, 8, and 9, and a cap 15, 115, 215 and 315 which is seen most clearly in FIGS. 2 and 10 through 16.

There is a configuration of flange and projections, shown generally by reference numeral 14, formed at a first end of the hollow tube 12. The tube, which typically would be made of plastic, has open first and second ends shown generally by reference numerals 17 and 18, respectively, in FIG. 4. Adjacent the first open end 17 there is provided the flange and projection construction 14. This construction preferably comprises a plurality (four in the exemplary embodiment illustrated in the drawings) of inverted L-shaped projections 19 which each have the L portion 20 thereof extending generally horizontally and adapted to abut the top of a bottle 11 at its neck 11' (as seen in FIGS. 10, 11, 14, 15 and 16), and having the leg portion 21 of the L extending radially a sufficient distance from the exterior surface 22 of the tube 12 so that it forms an interference fit with the bottle 11 at the neck 11'. The bottom of the leg 21 is typically tapered, as illustrated by reference numeral 23 in FIG. 6, as by having a 30 degree angle, so that as the tube 12 is inserted into the bottle the tapered portions 23 will help locate and position the projections 19 within the bottle.

Figure 5:
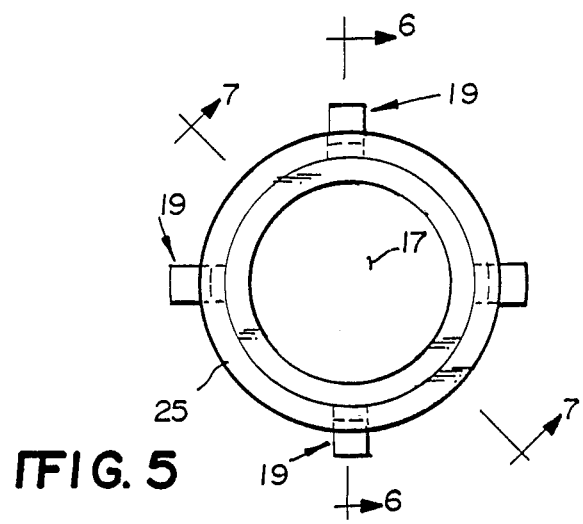
FIG. 5 is a top plan view of the tube of FIG. 4.
Figure 4:
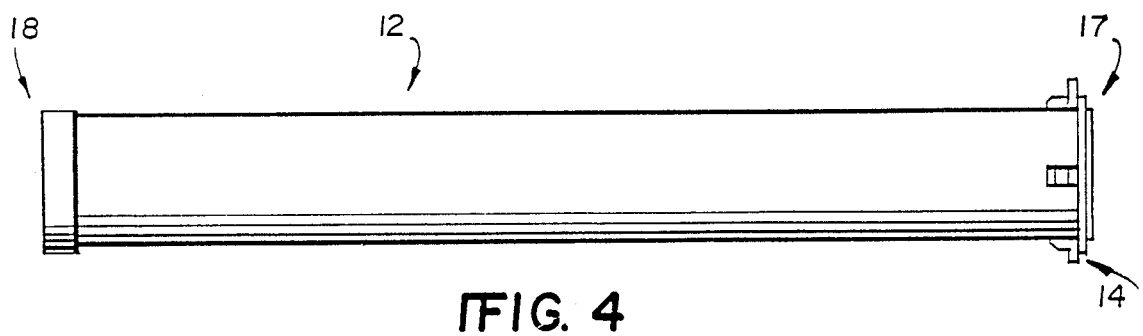
FIG. 4 is a side view of the elongated tube component of the device of FIG. 1.
Figure 6:
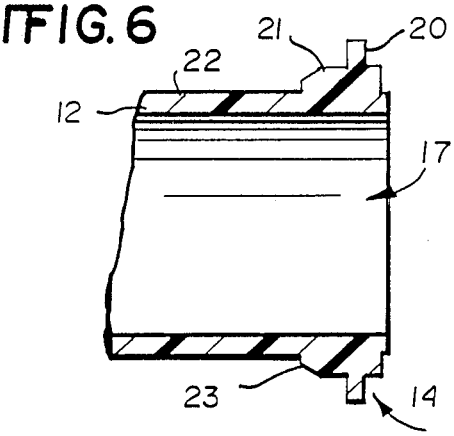
FIGS. 6 and 7 are cross-sectional views of the tube of FIG. 5, taken along lines 6—6 and 7—7 thereof.
Figure 7:
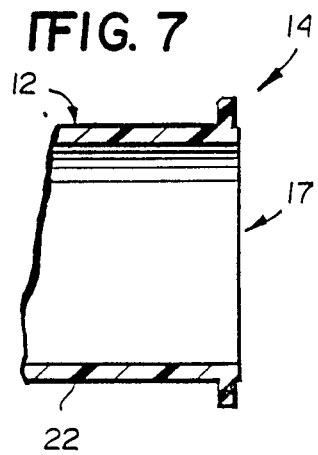

Located "above" the plurality of attaching projections 19 is a flange 25 which is circumferentially continuous around the tube 12, as seen most clearly in FIG. 5. The flange 25 assists—when the bottle 11 is being filled with liquid such as water from a faucet 30—see FIG. 2—in preventing the water from entering the bottle 11 except through the open end 17 of the tube 12. However the flange 25 does allow water to flow between the interior surface of the neck 11' and the exterior surface 22 of the tube 12, as can be seen by the flow arrows indicated in FIG. 11.

Located adjacent the second end of the tube 12, within the tube 12, is the water treatment media. The water treatment media preferably is provided within a cartridge 13, which cartridge 13 preferably is also of plastic. A screen (not shown) at the distal end of cartridge 13 prevents the media from flowing into the bottle 11 with the treated water.

The water treatment media may be any one or more of the following, in various tiers or levels: activated carbon, or like material for the removal of organics from the water; silver impregnated coral sand, or other media, or other bacteriastatic material, for destroying bacteria within the water; ion exchange resins (such as hydrogen based cation exchange resin for the removal of sodium) for removal ionic materials from the water; and/or materials which leach magnesium and/or calcium back into the water or removing bacteria by microfiltration, or adding vitamins, minerals & flavorings to the water. With respect to the last material, since sodium ion exchange softening often results in the removal of magnesium and calcium from the water, and since those ions are desirable in the water, the water is "reconstituted". Of course if a mixed ion exchange resin bed is provided as a water treatment media within the cartridge 13, the calcium and magnesium leaching material would be provided downstream of the ion exchange resin. Note that any variety of water treatment media desired could be disposed within the tube 12, so that it would be useful for treating water for use in steam irons, batteries, and other devices which can desirably employ deionized water.

The cap 15 is preferably of high density polyethylene, or a like plastic (that is, one having properties generally comparable to those of high density polyethylene). The cap performs a number of functions, but primarily serves to seal off the open end 17 of the tube 12 during pouring so that only liquid which has been treated by the media within the cartridge 13 will be dispensed from the container 11.

Figure 10:
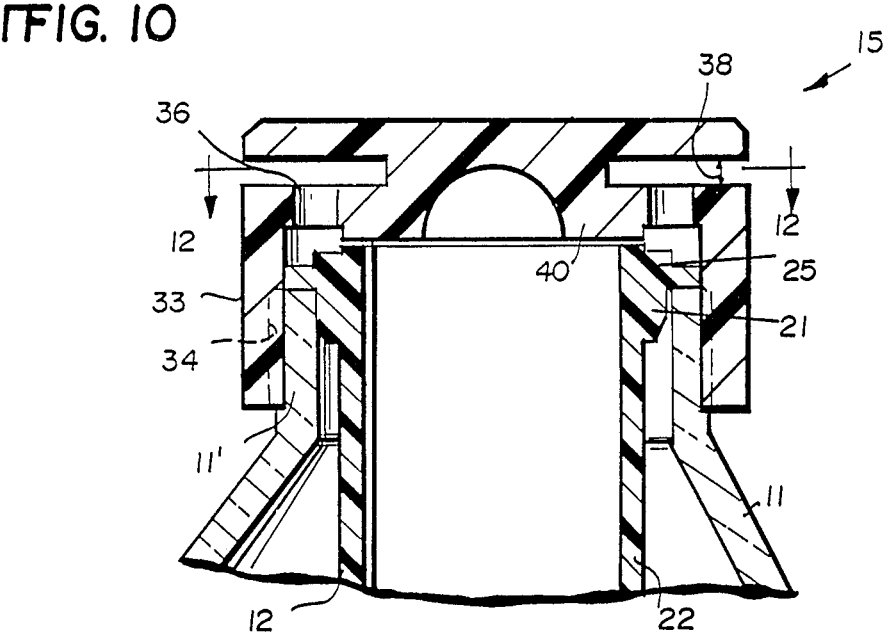
FIG. 10 is a side cross-sectional view of the assembled device according to the invention in association with a bottle, the cross-section being taken at an area of the tube where it has an interference fit with the bottle.
Figure 11:
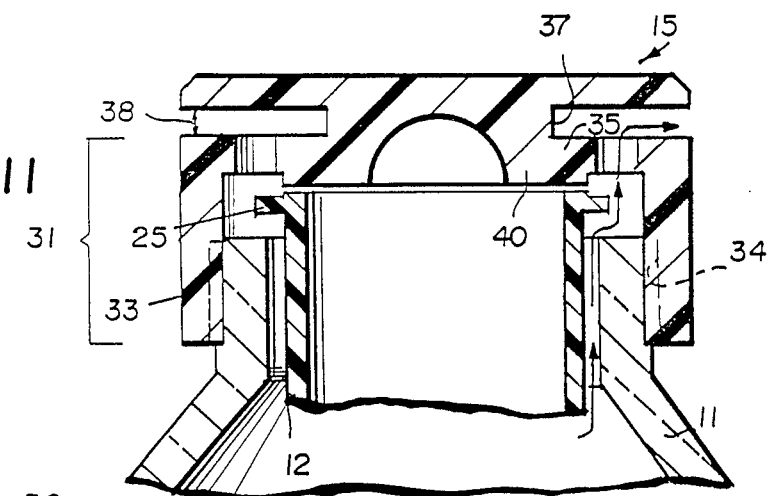
FIG. 11 is a view similar to that of FIG. 10 but wherein the cross-section is taken at an area of the tube between the interference-fit providing projections.
Figure 12:
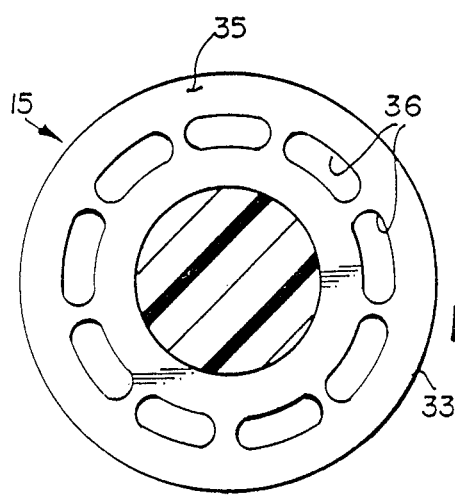
FIG. 12 is a cross-sectional view of the cap of the device of FIG. 10 taken along lines 12—12 thereof.

In the embodiment illustrated in FIGS. 10 and 11, the cap 15 is provided with a lower portion 31 thereof and an upper portion 32. The lower portion is generally cylindrical in configuration including a continuous side element 33 which preferably has internal screw threads, shown generally by reference numeral 34 in FIGS. 10 and 11, associated therewith which cooperate with external screw threads (not shown) disposed on the neck 11' of the container 11. The lower portion 31 also includes a top surface 35 which has means defining a plurality of openings 36 therein (see FIGS. 10 through 12) through which openings liquid being poured flows. As illustrated in FIG. 12, each of the openings 36 is circumferentially spaced from the others, for example each opening 36 may cover an arc of about 20 degrees, with about 20 degrees between the major portions of the openings 36, and the collective openings 36 extend substantially 360 degrees around the circumference of the top surface 35 so that liquid can be poured through the cap 15 irrespective of the orientation of the cap with respect to the bottle.

Figure 14:
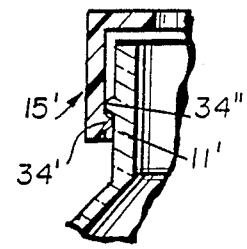
FIG. 14 is a side schematic cross-sectional view of a modified form of device which employs snap rings to secure the cap to a bottle.

Instead of screw threads, snap rings or the like, may be provided as projections for holding the cap on the bottle. FIG. 14 schematically illustrates a cap 15' with snap rings 34' cooperating with a like circumferentially continuous snap ring 34" on the bottle neck 11'.

Note that an integral intermediate stem portion 37 is provided which interconnects the top portion 32 and the lower portion 31, there being a fixed spacing—shown generally by reference numeral 38 in FIG. 11—between the portions 31, 32 sufficient to allow liquid to flow therebetween. The upper portion 32 is substantially co-extensive with the lower portion 31, and covers the openings 36 so that contaminants cannot enter the treated water through the top of the cap.

The central portion of the top surface 35, denoted by reference numeral 40 in FIGS. 10 and 11, engages the top surface of the tube 12 adjacent the first end 17 thereof and seals it (see FIGS. 10 and 11) so that water may not flow from the interior of the tube 12 to the openings 36. Due to the material of which the cap 15 is made, and/or the material of the tube 12, and the tolerances between the components, the seal is tight enough to essentially prevent any flow of liquid from the interior of the tube 12 to the openings 36.

Figure 13:
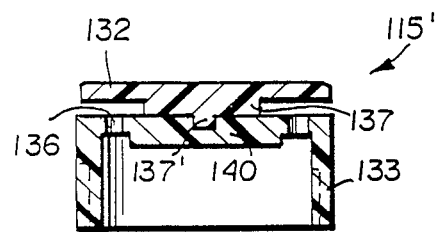
FIG. 13 is a side cross-sectional view of a modified form of cap according to the present invention.

FIG. 13 shows an alternative construction of a cap 115 according to the invention. This construction is similar to that shown in FIGS. 10 and 11 except that the upper portion 132 of the cap is removable, there being a peg 137' which provides a connection between the stem portion 137 and the central sealing portion 140. By grasping the upper portion 132 and pulling upwardly, the portion 132 may be detached from the central portion 140 by the peg 137' being pulled out of the hole for it formed in the central portion 140, and by the reverse action it may be snapped into place.

Figure 15:
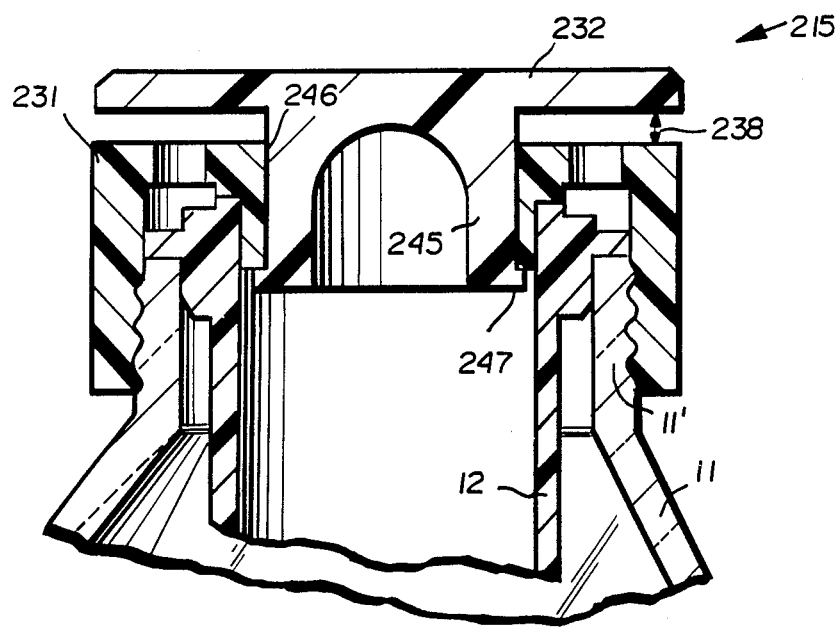
FIG. 15 is a side cross-sectional view of the assembled device according to another embodiment of the invention wherein the upper portion of the cap is friction fit within the lower portion of the cap and movable between open and closed positions.

In FIG. 15, an alternative exemplary cap construction 215 is shown wherein like numerals, prefixed by a "2" are used to designate elements corresponding to the embodiment shown in FIGS. 10 and 11. The cap 215 is similar in construction to the previously described embodiments, with the essential differences that a flat disc-like upper portion 232 is friction fit within lower portion 231 for sliding movement between open and closed positions. Thus, whereas the embodiment shown in FIGS. 10 and 11 has a fixed spacing 38 between the upper and lower cap portions, the embodiment in FIG. 15 permits a corresponding space 238 to be closed to prevent spillage in the event the container is tipped over, and to assist in maintaining the freshness of the contained liquid.

To this end, the upper portion 232 is provided with a depending substantially hollow, annular center stem portion 245 which is slidably received within a bore 246 formed in the lower cap portion 231. The stem portion 245 has a relatively large diameter approaching the inner diameter of tube 12.

After assembly, the lower end of stem 245 is flattened in the manner of a conventional rivet to form an outwardly directed flange or stop means 247 which serves to capture the upper portion 232 within the lower portion 231 and to limit upward movement of the upper portion relative to the lower portion. In this regard, stem 245 has an axial length greater than the bore 246 in order to create the space 238 when the upper portion is pulled upwardly into an open position.

It will be further understood that stem 245 is friction fit within the bore 246 so that the cap, once opened, will remain open until pushed downwardly into a closed position. The cap otherwise functions identically to the embodiment illustrated in FIGS. 10 and 11.

Figure 16:
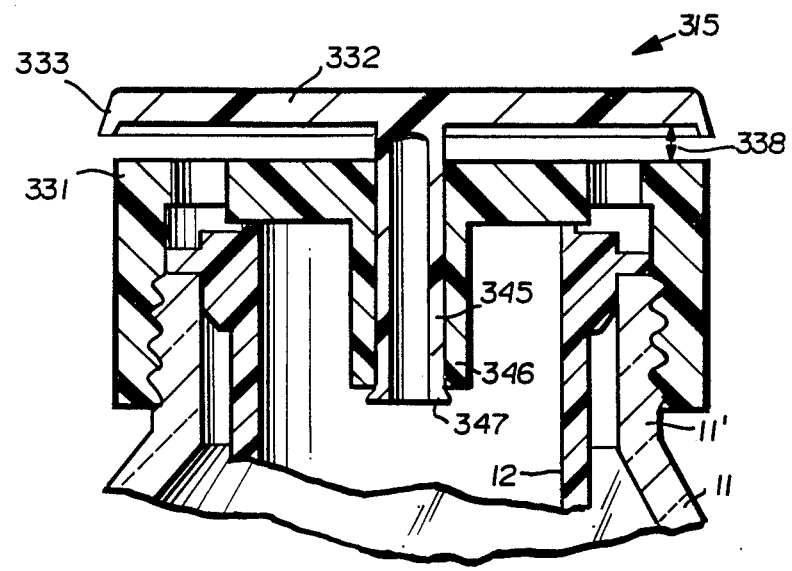
FIG. 16 is a side cross-sectional view of the assembled device according to still another embodiment of the invention wherein the upper portion of the cap is freely slidable within the lower portion of the cap and gravity actuated between open and closed positions.

In FIG. 16 there is illustrated still another exemplary embodiment of a cap construction according to this invention. Again, like numerals but prefixed by a "3", are used to designate common components. In this exemplary embodiment, a flat, disc-like upper portion 332 of the cap 315 is freely slidable within the lower portion 331 for gravity actuated movement between open and closed positions. Whereas the upper portion 232 in the FIG. 15 embodiment, once opened, remains open until pushed closed, the upper portion 332 in FIG. 16 will remain in a normally closed position so long as the container is in an upright position. Upon inverting, or at least tilting beyond a horizontal orientation, as when liquid is to be dispensed from the container, the upper portion will automatically slide to an open position to permit liquid to flow out of the container in the manner previously described.

More specifically, the upper portion 332 of the cap is provided with an elongated, hollow stem portion 345 which is freely slidably received within a bore provided in a concentrically arranged, sleeve-like portion 346 which depends from the interior of the lower cap portion. As in the FIG. 15 embodiment, the lower edge of stem 345 is flattened after assembly to provide stop means in the form of a flange 347 which captures the upper portion 332 within the lower portion 331.

It will be understood that the stem 345 and sleeve like portion 346 are dimensioned such that there is sufficient clearance to enable the upper portion to slide freely within the bore, but not enough to permit the escape of any liquid from the container through the tube 12.

As in the FIG. 15 embodiment, the stem 346 has an axial length greater than the sleeve-like portion in order to create space 338 when the upper portion is gravity actuated to an open position. Upper portion 332 may be formed with a depending skirt-like edge 333 which surrounds the upper edge of lower portion 331 when in the closed position. The cap otherwise functions identically to the previously described caps.

Figure 17:
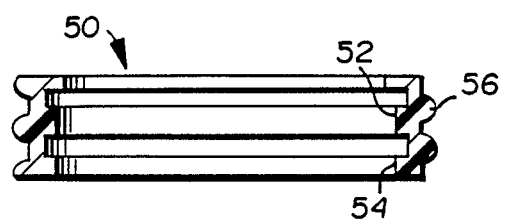
FIG. 17 is a cross-sectional view of an adaptor element in accordance with another aspect of the invention.

Turning now to FIG. 17, an adaptor 50 is shown which serves to convert a standard snap-on cap container or bottle to a screw-on cap container. While the previously described cap constructions have been described in terms of use with screw-on cap containers, plastic bottles and the like, it is also typical of prior art containers to have a snap-on configuration, as previously described in conjunction with FIG. 14, wherein caps are simply pushed over a series of raised circumferential beads or the like. In order to facilitate use of the water treatment apparatus described herein with both types of conventional prior art bottles or containers, an adaptor 50 is provided. As shown, the adaptor 50 comprises an annular band of material, preferably plastic, which is provided on its interior surface with a plurality of raised ribs 52, 54. The exterior surface is provided with a conventional screw thread configuration 56. The adaptor is designed to be placed over a conventional snap-on cap container such that the ribs of the adaptor snap into place over cooperating ribs or rings formed on the container neck. Cap constructions as described in conjunction with FIGS. 10, 11, 13, 15 and 16 are then simply screwed onto the container in a conventional fashion. While the variously described cap constructions may be formed with ribs or snap rings for use with snap-on type containers, it will be appreciated that the adaptor 50 provides a convenient expedient allowing the use of a single cap construction of uniform design with different container and bottle types.

Operation

Exemplary apparatus according to the present invention having been described, an exemplary manner of the use thereof will now be set forth.

The cartridge 13 is filled with a suitable water treatment media, such as activated charcoal, and is inserted into the second end 18 of the tube 12 so that it is disposed in place within the tube 12, or slips over the exterior of the tube 12, depending upon the relative diameters of the components. Alternatively the cartridge 13 may have an interior diameter substantially the same as the exterior diameter of the tube at end 18, and they are joined together by matching tapered edges.

The tube 12 is then inserted into the bottle or container 11, the second end 18 thereof passing through the neck 11' of the bottle 11, and insertion continuing until the projections 19 engage the interior surface of the neck 11, providing an interference fit therewith, and the cross portion of each "L", 20, engages the top of the neck 11'. This structure, with the cap 15 removed, is then filled with water, as from a faucet 30 (see FIG. 2), the water passing through the tube 12, and the media within the cartridge 13, which treats the water, and the water then flowing to the interior of the bottle 11. The flange 25 substantially prevents any liquid from flowing into the bottle 11 between the exterior surface 22 of the tube 12 and the interior of the neck 11'.

Figure 3:
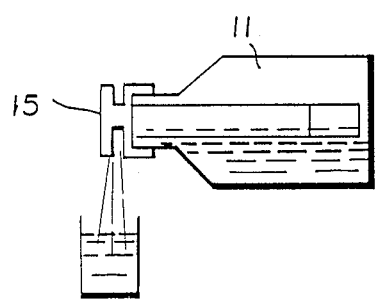
FIG. 3 is a side schematic view of the device and bottle of FIG. 1 as utilized for pouring treated liquid out of the bottle.

After a sufficient volume of water has been introduced into the bottle 11, a cap as disclosed in any one of FIGS. 10, 11, 13, 14, 15 and 16 is disposed on top of the bottle by placing the lower portion 31 thereof over the bottle neck 11', and then snapping or screwing the cap into place. If the bottle is of the snap-on type, an adaptor 50 may be used to convert it to a screw-on type as previously described. Screwed down completely, the central portion 40 of the cap will abut and seal the top of the tube 12 adjacent the open end 17 thereof. When it is desired to use the treated drinking water within the bottle 11, as illustrated in FIG. 3 the bottle is merely turned over to pour the liquid out of the top, the liquid passing, as illustrated by the flow arrows in FIG. 11 and as illustrated schematically in FIG. 3, between the exterior surface 22 of the tube 12 and the interior of the neck 11' of the bottle, past the flange 25, through openings (one or more openings) 36, into the space 38 between the cap portions 31, 32, and completely out of the bottle. It will be understood that if the cap is of the type disclosed in FIG. 15, upper portion 232 must first be pulled upwardly into an open position.

Because the openings 36 are provided around the complete circumference of the cap, it does not make any difference what the orientation of the bottle is during pouring.

It will thus be seen that according to the present invention a simple, inexpensive, yet effective water treatment apparatus has been provided for treating water for drinking, household use, and the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. In combination with a bottle having a neck with an interior surface and an exterior surface:
   an elongated tube having first and second ends, said first end having means for operatively connecting said tube to said interior surface of said bottle neck;
   water treatment means disposed within the interior of said tube for treating water passing through said tube; and
   cap means attachable to the bottle neck for closing off the first end of said tube, and for movement between open and closed positions while said first end of said tube is closed; and including means permitting discharge of liquid from within the bottle in a path between the tube and the bottle neck.

2. Apparatus as recited in claim 1 wherein said cap means in said open position allows passage of liquid therethrough substantially at any point around a 360 degree circumference thereof.

3. Apparatus as recited in claim 1 wherein said cap means operatively connects to the exterior surface of said bottle neck by a screw-threaded connection.

4. Apparatus as recited in claim 1, wherein said cap means operatively connects to the exterior surface of said bottle neck by a snap-on connection.

5. Apparatus as recited in claim 1, wherein said cap means is constructed of a plastic material.

6. Apparatus as recited in claim 1, wherein said bottle is adapted for receiving a cap with a snap-on connection and wherein said cap means is adapted for operative connection to the exterior surface of said bottle by a screw-on connection, said apparatus further comprising adaptor means for converting said snap-on connection to a screw-on connection.

7. Apparatus as recited in claim 1 wherein said cap means comprises an upper portion axially movable relative to a lower portion between open and closed positions, the lower portion having means defining a plurality of openings in a top surface thereof underlying said top portion, said openings being circumferentially spaced from each other around said cap; said upper and lower portions being spaced from each other in said open position a distance sufficient to allow liquid to flow through said openings in said lower portion top surface into the space between said upper portion and said lower portion, and then away from said cap.

8. Apparatus as recited in claim 7, wherein said upper portion frictionally, slidably engages said lower portion such that said upper portion may be pulled upwardly to an open position and pushed downwardly to a closed position.

9. Apparatus as defined in claim 8, wherein said cap upper portion includes a flat disc-like portion and an annular depending stem portion, said stem portion slidably received within said lower portion and having a diameter approaching the inner diameter of said elongated tube.

10. Apparatus as defined in claim 9, wherein said depending stem portion has a lower edge formed with radially outwardly stop means adapted to cooperate with a lower edge of said lower portion to limit upward axial movement of said cap upper portion.

11. Apparatus as defined in claim 7, wherein said axial movement of said upper portion relative to said lower portion is gravity actuated.

12. Apparatus as defined in claim 11, wherein said upper portion is freely slidably received in said lower portion such that when said bottle is in a normal upright position, said cap is in said closed position, and when said bottle cap is tilted downwardly beyond a horizontal position, said cap slides to said open position.

13. Apparatus as defined in claim 12 wherein said cap upper portion includes a flat disc-like portion and an annular, depending stem portion, said stem portion freely slidably received within a bore formed in a sleeve-like stem formed in said lower portion.

14. Apparatus as defined in claim 13, wherein said depending stem portion has a lower edge formed with radially outwardly directed stop means adapted to cooperate with a lower edge of said sleeve-like stem to limit upward axial movement of said cap upper portion.

15. Apparatus as recited in claim 1, wherein said water treatment means disposed within said tube comprises a cartridge containing a water treatment media.

* * * * *